United States Patent [19]

Yan

[11] Patent Number: 5,512,956
[45] Date of Patent: Apr. 30, 1996

[54] ADAPTIVE SPATIAL-TEMPORAL POSTPROCESSING FOR LOW BIT-RATE CODED IMAGE SEQUENCES

[75] Inventor: Li Yan, Holmdel, N.J.

[73] Assignee: AT&T Corp., Murray Hill, N.J.

[21] Appl. No.: 191,685

[22] Filed: Feb. 4, 1994

[51] Int. Cl.⁶ .................................. H04N 5/213
[52] U.S. Cl. ................. 348/606; 348/620; 348/627; 348/413; 348/421
[58] Field of Search ..................... 348/412, 413, 348/421, 415, 416, 606, 607, 620, 627, 619, 497; H04N 5/213

[56] References Cited

U.S. PATENT DOCUMENTS

| | | | |
|---|---|---|---|
| 4,352,126 | 9/1982 | Poncin et al. | 348/620 |
| 4,361,853 | 11/1982 | Remy et al. | 348/616 |
| 4,691,366 | 9/1987 | Fenster et al. | 348/607 |
| 4,891,699 | 1/1990 | Hamada et al. | 348/415 |
| 5,041,908 | 8/1991 | Henot | 348/413 |
| 5,134,480 | 7/1992 | Wang et al. | 348/620 |
| 5,379,074 | 1/1995 | Hwang | 348/607 |
| 5,404,178 | 4/1995 | Kondo et al. | 348/620 |

*Primary Examiner*—James J. Groody
*Assistant Examiner*—Jeffrey S. Murrell

[57] ABSTRACT

A 3D nonlinear postprocessing system and method are utilized to reduce coding artifacts produced by block-based motion-compensated transform coding. In the system and method, a separable 3D filtering structure is used: space-variant FIR-Median Hybrid filtering is used in spatial domain, followed by a motion-compensated nonlinear filtering in the temporal domain. By using this structure and method, the coding artifacts in a reconstructed image sequence can be effectively reduced without blurring edges or moving objects in the image sequence. Significant improvement in the picture quality of low bit-rate coded video sequences is thereby achieved.

29 Claims, 5 Drawing Sheets

ADAPTIVE SPATIAL-TEMPORAL POSTPROCESSING FOR LOW BIT-RATE CODED IMAGE SEQUENCES

BACKGROUND OF THE INVENTION

1. Field of the Invention

The present invention relates generally to the field of digital video processing and, more particularly, to a system and method for post-processing decompressed motion video sequences where a block-based motion-compensated transform coding technique is used for compression and decompression.

2. Description of the Related Art

Video images can be represented by a digital signal in which a series of bits of information is used to represent each video frame. Where the bandwidth of a particular communication system is limited, such as in the integrated services digital network (ISDN) or the public telephone network, low bit-rate image coding is particularly useful for transmitting visual images and communications. As such, increasing demands have been placed on the use of low bit-rate coding. Low bit-rates between p×9.6 kbit/s and p×384 kbit/s are most frequently used for low bit-rate transmissions. As demands increase, the picture quality of video images generated through low bit-rate coding becomes critical.

Coded picture quality is generally determined by the type of coding technique used and the targeted bit rate. Coding processes, however, have inherent loss characteristics. Images coding often results in noise or spurious signals upon reconstruction of the image. Noise and spurious signals that occur as a result of such imaging techniques are often referred to as artifacts. Artifacts can often reach a level where they appear in the video image with as much strength as the signals produced by the real objects of the image. Moreover, artifacts often become even more visible for low bit-rate transmissions.

The characteristics of these artifacts depend on the form of coding technique used. Currently, the most well-known and popular low bit-rate coding technique involves block-based motion-compensated transform coding. Such a coding technique is used in many image compression standards, such as the CCITT (Consultative Committee on International Telegraphy and Telephony) Recommendation H.261, Draft Revised Recommendation H.261-Video Codec for Audiovisual Services at p×64 kbit/s, Study Group XV-Report R95 (May 1992), herein incorporated by reference, and the more recent proposals arising out of the Telecommunication Standardization Sector Study Group 15, Working Party 15/1 Expert's Group on Very Low Bitrate Videophone (LBC-93), herein incorporated by reference.

This CCITT standard, although an image compression standard often used for multimedia applications, produces highly noticeable artifacts upon reconstruction of an image at low bit-rate. Those artifacts are often referred to as "blocking effects", "quantization noise" and the "mosquito phenomenon". Future standards using block-based motion-compensated transform coding will likely also produce such artifacts.

"Blocking effects" are spatial domain distortions which appear as discontinuities on the edges of an image and which yield average values of luminance and chrominance across a block boundary, a so-called spatial artifact. These distortions are caused by using different coding parameters for adjacent blocks. For blocks containing edges, edges can be discontinuous on block boundaries since each block is coded independently of its neighbors. Similarly, for monotone blocks where the intensity in the original image changes gradually, the intensity in the coded blocks can change abruptly from one block to another, due to the different quantization parameters used for each block.

"Quantization noise" is a distortion caused by quantization processes. When a quantization step size is small, the distortion caused by the quantization is called granular noise, a noise with a high spatial frequency that is evenly distributed over an entire block. This noise is independent of the signal. When a quantization step size is large, the quantization noise is signal-dependent since the signal can be all mapped to zero. Where large quantization forces the high frequency components to zero, the artifacts can be described as "noise contour". Various coefficients used in Discrete Cosine Transform (DCT) techniques may cause this distortion to spread over the entire block when the edge block is transformed into the DCT domain, particularly in view of the fact that DCT techniques are inefficient in representing edges compared with flat areas. Significant losses in edge information and the creation of speckle-like distortions near the edges of a particular block may occur as a direct result of coarse quantization of the DCT coefficients.

The "mosquito phenomenon" is a high frequency granular type of noise, which appears similar to a moving cloud of insects, that is caused by motion compensation and quantization processes. This phenomenon is a distortion which appears in the temporal domain, a so-called temporal artifact. These artifacts further degrade reconstructed picture quality.

Therefore, to improve the reconstructed picture quality, postprocessing to reduce the aforementioned artifacts is frequently necessary.

There have been many nonlinear postprocessing techniques proposed for reducing coding artifacts and for improving reconstructed picture quality. For example, in an article published by B. Ramamurthi and A. Gersho, "Nonlinear Space-Variant Postprocessing of Block Coded Images", IEEE *Trans. on Acoustics, Speech, and Signal Processing*, VOL. ASSP-34, No. 5, October 1986, the authors proposed a space-variant nonlinear postprocessing technique.

Similarly, in articles published by R. L. Stevenson, "Reduction of Coding Artifacts in Transform Image Coding", *Proceedings of the International Conference on Acoustics, Speech, and Signal Processing*, 1993; and A. Zakhor, "Iterative Procedures for Reduction of Blocking Effects in Transform Image Coding", IEEE *Transactions on Circuits and Systems for Video Technology*, Vol. 2, No. 1, March 1992, pp. 91–95, Lee et al., "Postprocessing of Video Sequence Using Motion Dependent Median Filters," SPIE Vol. 1606 Visual Communications and Image Processing '91, Image Processing, July 1991, among others, the authors proposed various techniques for improving picture quality.

However, the aforementioned proposed techniques were designed to reduce artifacts produced by either still image coding techniques, where no motion compensation is employed, or other coding techniques which do not utilize block-based motion-compensated transform coding.

In addition, in articles published by A. Nieminen, P. Heinonen, and Y. Neuvo, "A New Class of Detail-Preserving Filters for Image Processing", IEEE *Trans. on Pattern Analysis and Machine Intelligence*, VOL. PAMI-9, No. 1, January 1987, and P. Heinonen, "FIR-Median Hybrid Filters", IEEE Trans. on Acoustics, Speech and Signal Processing, VOL. ASSP-35, No. 6, June 1987, various filtering techniques have also been proposed.

Different coding techniques produce different artifacts. As such, motion-compensated coding techniques often introduce different spatial and temporal artifacts on the reconstructed picture. Techniques proposed by these various authors are unnecessarily complex and often fail to account for the different spatial and temporal artifacts produced by block-based motion-compensated transform coding. As such, the various techniques proposed to date are not particularly efficient for eliminating spatial and temporal artifacts from decompressed signals generated by block-based motion-compensated transform coding.

FEATURES AND ADVANTAGES OF THE INVENTION

The present invention achieves many advantages and contains features for efficiently reducing artifacts introduced into video images by block-based motion-compensated transform coding. One feature of the present invention includes the ability to optimize video images transmitted at low bit-rates. Another feature includes the ability to adapt spatial and temporal filtering to local signal statistics.

These and other features of the present invention achieve significant reduction in coding artifacts without blurring or distorting (1) the edges of video images and (2) moving objects in the image sequence.

In addition, the present invention achieves the advantages associated with the use of low-cost filtering techniques, which are not unnecessarily complex, to optimize video picture quality.

SUMMARY OF THE INVENTION

The present invention provides a system and method for enhancing decompressed motion video sequences, where the compression technique involves block-based motion-compensated transform coding.

In one embodiment of the present invention, a separable 3D filtering structure is used: space-variant FIR-Median hybrid filtering is used in the spatial domain, followed by motion-compensated nonlinear filtering in the temporal domain. By using this structure, the coding artifacts in the reconstructed image sequence can be effectively reduced without blurring edges or moving objects in the image sequence.

In addition, the present invention provides spatial and temporal operations which are adaptive to the local statistics of the signal, both spatially and temporally. One-dimensional spatial operations for edge oriented pixels and two-dimensional spatial operations for nonedge pixels are followed by motion compensated nonlinear temporal filtering to optimize a reconstructed picture.

In particular, the present invention provides spatial operations which switch between linear and nonlinear filtering depending on the spatial local statistics of the signal. Specifically, a two-dimensional low-pass filter is used for flat areas and one-dimensional space-variant FIR-Median hybrid filters are used for edge areas. The FIR-Median hybrid filter is designed so its root structure is parallel with the direction of the edge orientation. The particular use of one-dimensional FIR-Median Hybrid filters with root structures parallel to the edge orientation achieves significant reduction in spatial artifacts on edge areas, thereby enhancing the definition and clarity of the edges without blurring the image.

In addition, the present invention includes a system and method for adaptive motion-compensated frame averaging, thereby reducing temporal artifacts without causing blurring of a moving object.

These, together with other features and advantages which will be subsequently apparent, reside in the details of construction and operation as more fully hereinafter described and claimed, with reference being had to the accompanying drawings forming a part hereof, wherein like numerals refer to like elements throughout.

DETAILED DESCRIPTION OF THE PREFERRED EMBODIMENT

Figure 1:
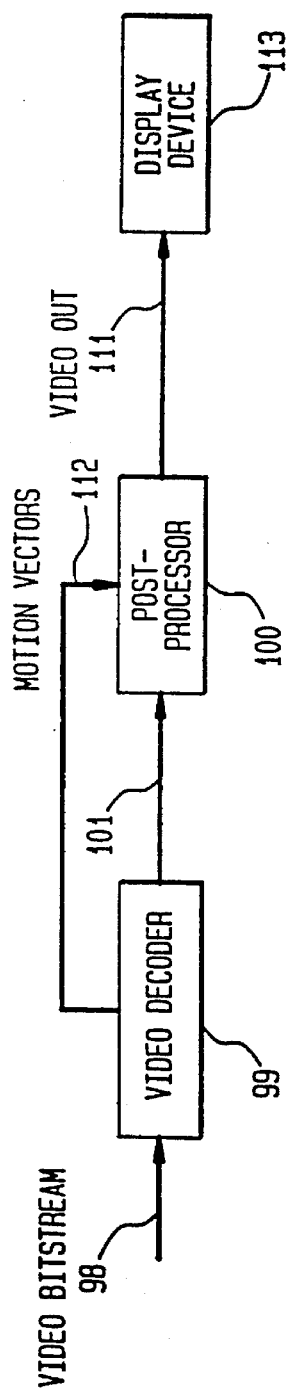
FIG. 1 is block diagram illustrating the basic operation of a video decoder with the postprocessing filtering system and method of the preferred embodiment of the present invention.

FIG. 1 is a simplified block diagram of a video decoder in use with the postfilter implementing the system and techniques of the present invention. A video bit stream 98 is supplied as input to the decoder 99, where the bit stream is decoded and the reconstructed digital video sequence 101 is produced. Signals 112 are motion vectors decoded from the video bitstream at decoder 99. The decoder 99 uses a block-based motion-compensated transform coding technique such as the technique utilized in H.261. The reconstructed digital video signal 101 and the motion information 112 are supplied to the postfilter 100 to produce a coding-artifacts-reduced-video-sequence 111. Coding-artifacts-reduced-video-sequence 111 is then displayed on a display device 113. Postfilter 100 is a postprocessor in that it processes information from a decoded and reconstructed video sequence 101.

Figure 2:
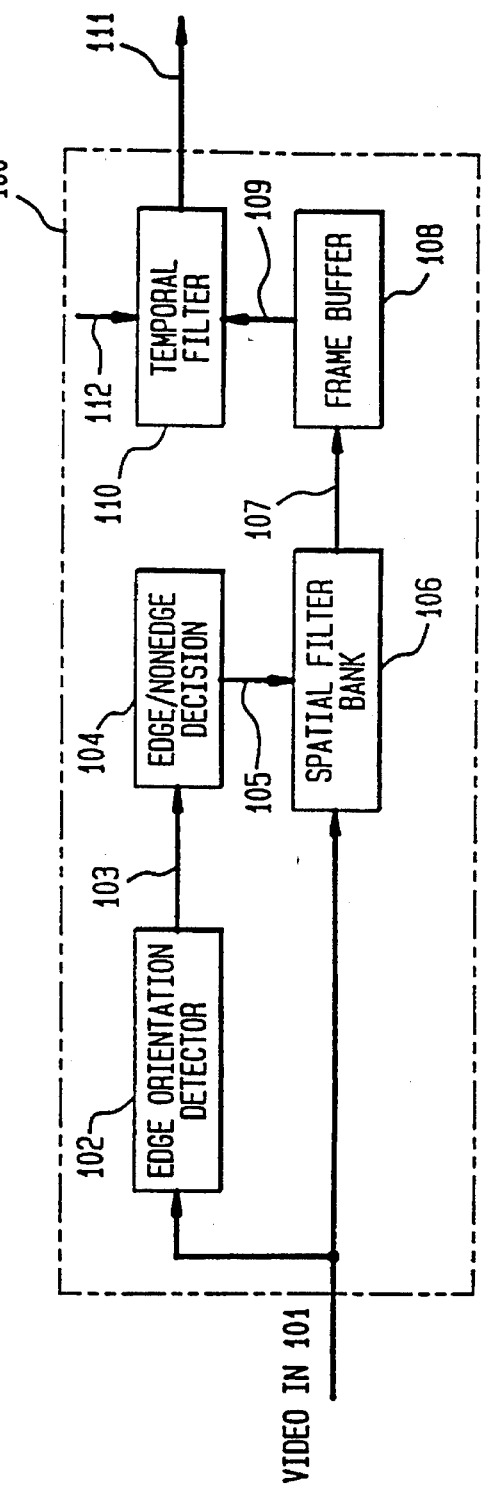
FIG. 2 is a block diagram illustrating the postprocessing filtering system and method of the preferred embodiment of the present invention.

FIG. 2 is a block diagram of the postfilter 100 implementing the techniques of the present invention. The postfilter 100 comprises generally the following components: an edge orientation detector 102, an edge/nonedge decision subprocessor 104, a spatial filter bank 106, a frame buffer 108, and a temporal filter 110, each of which will be described in greater detail below.

Postfilter 100 which implements all of the decision processes of the present invention is preferably a digital signal processor such as a model DSP 3210 manufactured by AT&T. An 80386 type processor manufactured by Intel® and other types of processors may also be used. In the alternative, each of the aforementioned components which implement various portions of the filtering processes of postfilter 100 may be separate processors.

With continuing reference to FIG. 2, the general operation of the postfilter 100 will now be described. A reconstructed video sequence 101 is first supplied as input to block 102, an edge orientation detector, where the edge orientation of each pixel in a video frame is detected. Edge orientation information is supplied as an input signal 103 to block 104, an edge/nonedge decision subprocessor, where the edge orientation signal 103 is compared with a predetermined threshold $T_g$ to produce a control signal 105.

The control signal 105 controls a bank of spatial filters at block 106. At block 106, the input signal 101 is filtered by the filter selected according to signal 105. The spatial filter bank at block 106 produces a signal 107 which comprises spatially filtered video frames. Spatially filtered video frames 107 are then stored at buffer 108. Buffer 108 is designed to store within its memory at least three temporal frames for subsequent temporal filtering. The three temporal frames consist of at least the following frames: a current frame, a previous frame, and a future frame. Buffer 108 yields its stored video frames as Signal 109. At block 110, the current video frame is filtered by using motion information, from signal 112, and the previous and the future spatially filtered frames to produce signal 111. Signal 111 is the final filtered video signal which is then transmitted to a display device 113.

Figure 3:
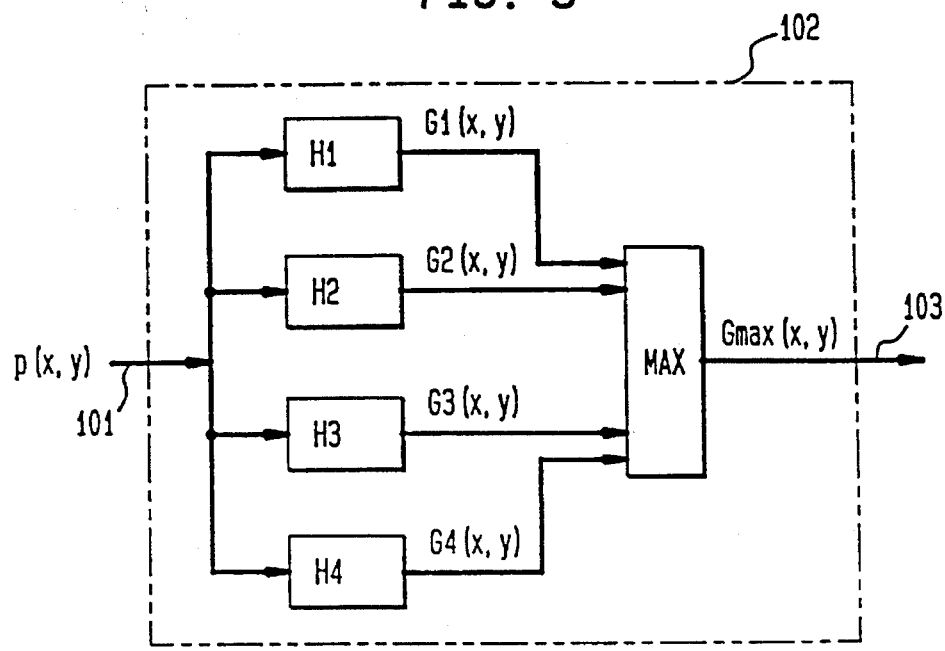
FIG. 3 is a block diagram illustrating the system and method of edge orientation detection performed by the preferred embodiment of the present invention.

FIG. 3 is a block diagram of an edge orientation detector 102. An unfiltered video frame is represented as f(x,y). A pixel in this unfiltered video frame is represented as p(x,y). For each pixel p(x,y), the edge orientations can be at one of four angles: 0°, 45°, 90°, and 135°. To compute the edge orientation at each point (x,y), a set of template gradient impulse response arrays $H_i$ is used. The template gradient impulse response arrays $\{H_i, i=1, \ldots, 4\}$ are defined as $$H_1 = \begin{bmatrix} -1 & -1 & -1 \\ 2 & 2 & 2 \\ -1 & -1 & -1 \end{bmatrix}, H_2 = \begin{bmatrix} -1 & -1 & 2 \\ -1 & 2 & -1 \\ 2 & -1 & -1 \end{bmatrix}, \quad (1)$$

$$H_3 = \begin{bmatrix} -1 & 2 & -1 \\ -1 & 2 & -1 \\ -1 & 2 & -1 \end{bmatrix}, H_4 = \begin{bmatrix} 2 & -1 & -1 \\ -1 & 2 & -1 \\ -1 & -1 & 2 \end{bmatrix}, \quad (2)$$

$H_1$ is the impulse response for the horizontal (0°) gradient, $H_2$ is the impulse response for the 45° gradient, $H_3$ is the impulse response for the vertical (90°) gradient, and $H_4$ is the impulse response for 135° gradient. The edge template gradient at any point (x,y) is defined as $$G_{max}(x,y) = \max\{|G_1(x,y)|, |G_2(x,y)|, |G_3(x,y)|, |G_4(x,y)|\} \quad (3)$$

where $$G_i(x,y) = f(x,y) \otimes H_i \quad (4)$$

is the gradient in the mth equispace direction obtained by convolving the image f(x,y) with a gradient impulse response array $\{H_i, i=1, \ldots, 4\}$. The edge angle is determined by the direction of the largest gradient $G_{max}(x,y)$ in signal 103. Edge orientation detector 102 performs the above processing to determine the edge orientation of each pixel in the video bitstream 98 decoded by video decoder 99.

Signal 103 is supplied to the edge/nonedge decision subprocessor 104 to produce control signal 105. At edge/nonedge decision subprocessor 104, in order to determine whether the pixel belongs to the edge or nonedge class, the maximum gradient $G_{max}(x,y)$ of the pixel p(x,y) in signal 103, is compared with a predetermined threshold $T_g$. The predetermined threshold $T_g$ is a value selected from experimental data. In the preferred embodiment, where H.261 guidelines are used, the pixel value is in the range of 0 to 255. Accordingly, in the preferred embodiment, $T_g$ is equal to a threshold of 20. If $G_{max}(x,y) > T_g$, then the pixel at position (x,y) belongs to the edge class with an edge orientation determined by the direction of the greatest gradient $G_{max}(x,y)$; otherwise, the pixel at (x,y) belongs to the nonedge class.

The edge or nonedge indication signal 105 is supplied to spatial filter bank 106. The edge/nonedge indication signal 105 indicates the specific edge orientation (i.e., 0°, 45°, 90°, 135°) or that the signal is not an edge signal.

Figure 4:
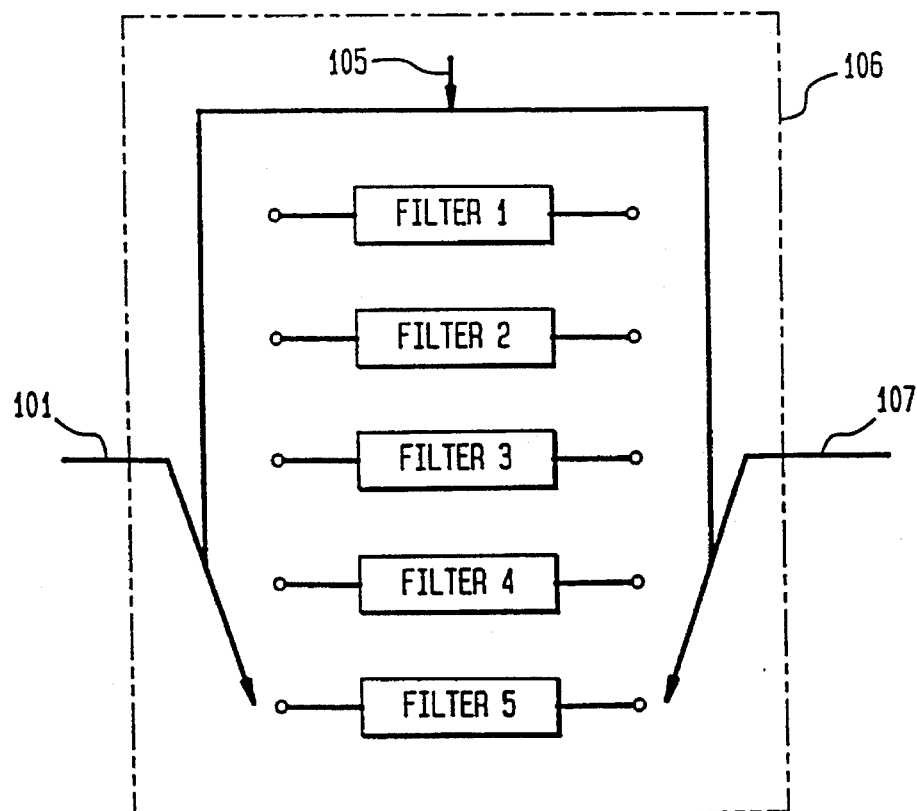
FIG. 4 is a block diagram illustrating the system and method of spatial filtering performed by the preferred embodiment of the present invention.
Figure 5A:
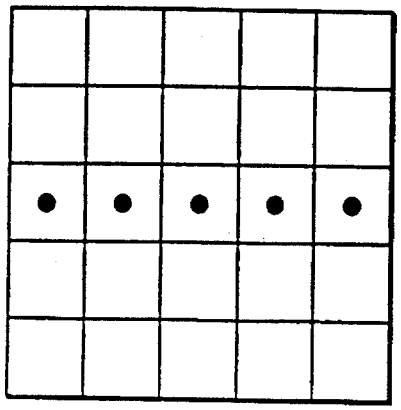
FIG. 5 is a diagram of the line structures parallel to the root structures of the spatial filters depicted in FIG. 4.
Figure 5B:
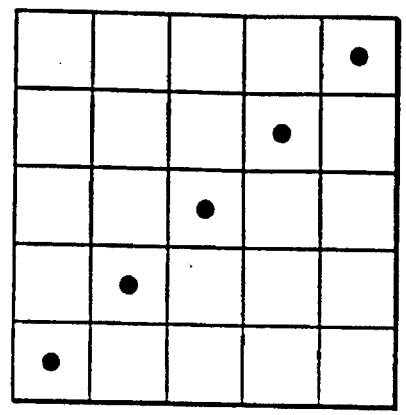
Figure 5C:
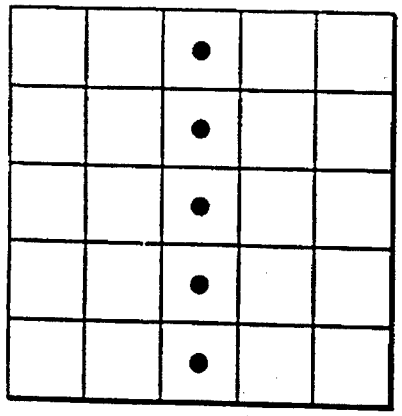
Figure 5D:
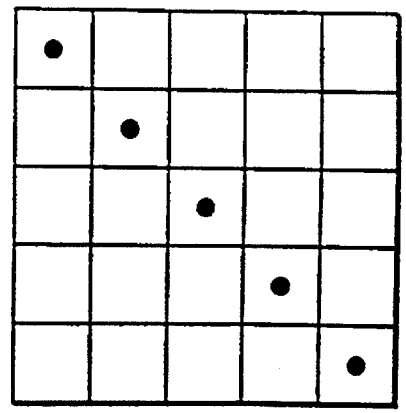

FIG. 4 is a block diagram of the spatial filter bank 106. The spatial filter bank 106 preferably consists of five filters. Filter 1 to Filter 4 are one-dimensional (1D) FIR-Median Hybrid (FMH) filters with root structures parallel to the line structures shown in FIG. 5.

If the edge orientation is determined to be 0° (FIG. 5a), filter 1 is selected; if the edge orientation is 45° (FIG. 5b), filter 2 is selected; if the edge orientation is 90° (FIG. 5c), filter 3 is selected; if the edge orientation is 135° (FIG. 5d), filter 4 is selected. For a nonedge pixel, filter 5 is selected. The decision to process the signal as an edge or a nonedge signal is controlled by edge/nonedge signal 105, as discussed above.

Generally, the 1D FMH filter used in the preferred embodiment of the present invention consists of 3 linear phase FIR filters and a median filter, although it is to be understood that the number of the FIR filters may be altered. The transfer functions of the three linear phase FIR filters of the preferred embodiment are as follows:

$$H_1(z) = \frac{1}{L}[z^L + z^{L-1} + \ldots + z^1] \quad (5)$$

$$H_2(z) = 1 \quad (6)$$

$$H_3(z) = \frac{1}{L}[z^{-1} + z^{-2} + \ldots + z^{-L}]. \quad (7)$$

where the window length is (2L+1). For example, if p(c) is the center pixel along a line within a window having a length of (2L+1), then the outputs of the three FIR filters are $$p_1 = \frac{1}{L}[p(c+1) + p(c+2) + \ldots + p(c+L)] \quad (8)$$

$$p_2 = p(c) \quad (9)$$

$$p_3 = \frac{1}{L}[p(c-1) + p(c-2) + \ldots + p(c-L)] \quad (10)$$

Essentially, therefore, the output of the first FIR filter $p_1$ is a function of the sum of all pixels along a line from (but not including) center pixel p(c) to the pixel at the edge of the window, p(c+L). Similarly, the output of the third FIR filter $P_3$ is a function of the sum of all pixels along the same line from (but not including) center pixel p(c) to the pixel at the opposite edge of the window, p(c−L). Meanwhile, the output of the center filter, $P_2$, is simply equal to center pixel p(c).

These filters are one-dimensional in that only one variable is utilized for incremental movement (pixel by pixel) along a predetermined fixed line. Thus, even though movement may occur in both the x and y directions (when a predetermined diagonal line is utilized) of a two-dimensional x-y coordinate frame, these filters utilize only a one-dimensional reference frame and therefore achieve the simplicity of a one-dimensional linear filtering technique.

The output of the FMH filter is $$P_{output} = \text{median } (p_1, p_2, p_3) \tag{11}$$

Figure 6:
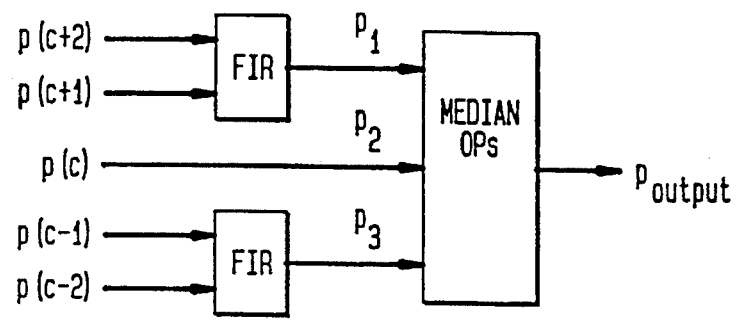
FIG. 6 is a diagram of the one-dimensional Finite-Impulse-Response-Median hybrid (FMH) filter utilized in the preferred embodiment of the present invention.

A diagram of the 1D FMH filter with a window of size 5 is shown in FIG. 6.

Figure 7:
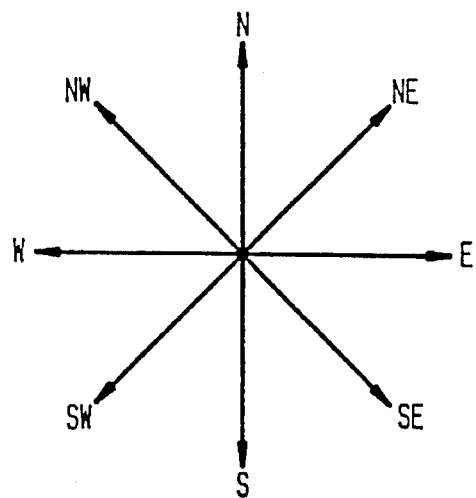
FIG. 7 is a diagram of the directions for use in determining the average taking of the Finite Impulse Response (FIR) linear phase subfilters of the preferred embodiment of the present invention.

In the preferred embodiment of the present invention, an index i, where i can be E, W, S, N, NE, SW, NW, and SE, is utilized to indicate the direction where the FIR filter is operated and measured from a central input pixel p(x,y). The output of each of the three FIR linear phase subfilters $p_i(x,y)$ is defined as the average taking over the linear direction i. A diagram of the linear directions E, W, S, N, NE, SW, NW, and SE, used in the preferred embodiment of the present invention is shown in FIG. 7. It is to be understood, however, that additional directions may be utilized.

The output of the FIR linear phase subfilters $p_i(x,y)$ in the directions shown in FIG. 7 are therefore defined as $$p_E(x,y) = \frac{1}{L} [p(x+1,y) + p(x+2,y) + \ldots + p(x+L,y)] \tag{12}$$

$$p_W(x,y) = \frac{1}{L} [p(x-1,y) + p(x-2,y) + \ldots + p(x-L,y)] \tag{13}$$

$$p_S(x,y) = \frac{1}{L} [p(x,y-1) + p(x,y-2) + \ldots + p(x,y-L)] \tag{14}$$

$$p_N(x,y) = \frac{1}{L} [p(x,y+1) + p(x,y+2) + \ldots + p(x,y+L)] \tag{15}$$

$$p_{NE}(x,y) = \frac{1}{L} [p(x+1,y+1) + p(x+2,y+2) + \ldots + p(x+L,y+L)] \tag{16}$$

$$p_{SW}(x,y) = \frac{1}{L} [p(x-1,y-1) + p(x-2,y-2) + \ldots + p(x-L,y-L)] \tag{17}$$

$$p_{NW}(x,y) = \frac{1}{L} [p(x-1,y+1) + p(x-2,y+2) + \ldots + p(x-L,y+L)] \tag{18}$$

$$p_{SE}(x,y) = \frac{1}{L} [p(x+1,y-1) + p(x+2,y-2) + \ldots + p(x+L,y-L)] \tag{19}$$

However, it is to be understood that although equations 12–19 define the outputs of the above-noted FIR linear phase subfilters in a two-dimensional x-y coordinate frame, the output of the filters is one-dimensional in that the average of all pixels along a direction from (but not including) a center pixel to the pixel at the edge of the window is calculated, thereby utilizing the one-dimensional linear filtering techniques of equations 8–10.

As there are four edge classes with edge orientations 0°, 45°, 90°, and 135°, the FMH filter with different root structures is applied to the pixels in each class. With p(x,y) as the center pixel within a square window with size (2L+1)×(2L+1), the output of filter 1 to filter 4 is defined as $$P_{filter1}(x,y) = \text{median}[p_E(x,y), p_W(x,y), p(x,y)] \tag{20}$$

$$P_{filter2}(x,y) = \text{median}[p_{NE}(x,y), p_{SW}(x,y), p(x,y)] \tag{21}$$

$$P_{filter3}(x,y) = \text{median}[p_N(x,y), p_S(x,y), p(x,y)] \tag{22}$$

$$P_{filter4}(x,y) = \text{median}[p_{NW}(x,y), p_{SE}(x,y), p(x,y)] \tag{23}$$

where $p_{filter*}(x,y)$ is the overall output taken over the median of the outputs of three FIR linear phase subfilters $P_i(x,Y)$ along the direction of the determined edge orientation.

While the aforementioned filtering techniques are used for edge pixels, a two dimensional (2D) low-pass filter 5 is used for nonedge pixels. If p(x,y) is the center pixel within a square window with size (2L+1)×(2L+1), then the output of the filter is $$p_{filter5}(x,y) = \frac{1}{(2L+1) \times (2L+1)} \sum_{j=-L}^{L} \sum_{k=-L}^{L} p(x+j, y+k). \tag{24}$$

To further reduce the coding artifacts, the spatially filtered video sequence is further filtered at block 110 temporally. Motion-compensated temporal filtering is performed particularly because such filtering will enhance artifact reduction in the moving areas of an image. To implement motion-compensated temporal filtering, motion information is needed. Theoretically, estimates regarding either forward motion information or backward motion information from the reconstructed image sequences may be utilized. However, as motion estimation can often be very complicated and therefore very expensive to compute, it is advantageous to not compute the motion vectors separately. Instead, the motion vectors extracted for decoding can be stored and reused for postprocessing. In most low-bit rate coding techniques such as H.261, block-based forward motion vectors are available, and these motion vectors can be extracted from the coded bitstream and stored for later postprocessing. The motion information used here is represented by signal 112. Additional disclosure regarding such motion vectors may be found within CCITT recommendation H.261 and a publication by A. Netravali and B. Haskell, "Digital Pictures Representation and Compression," Plenum Press: New York, 1989.

Figure 8:
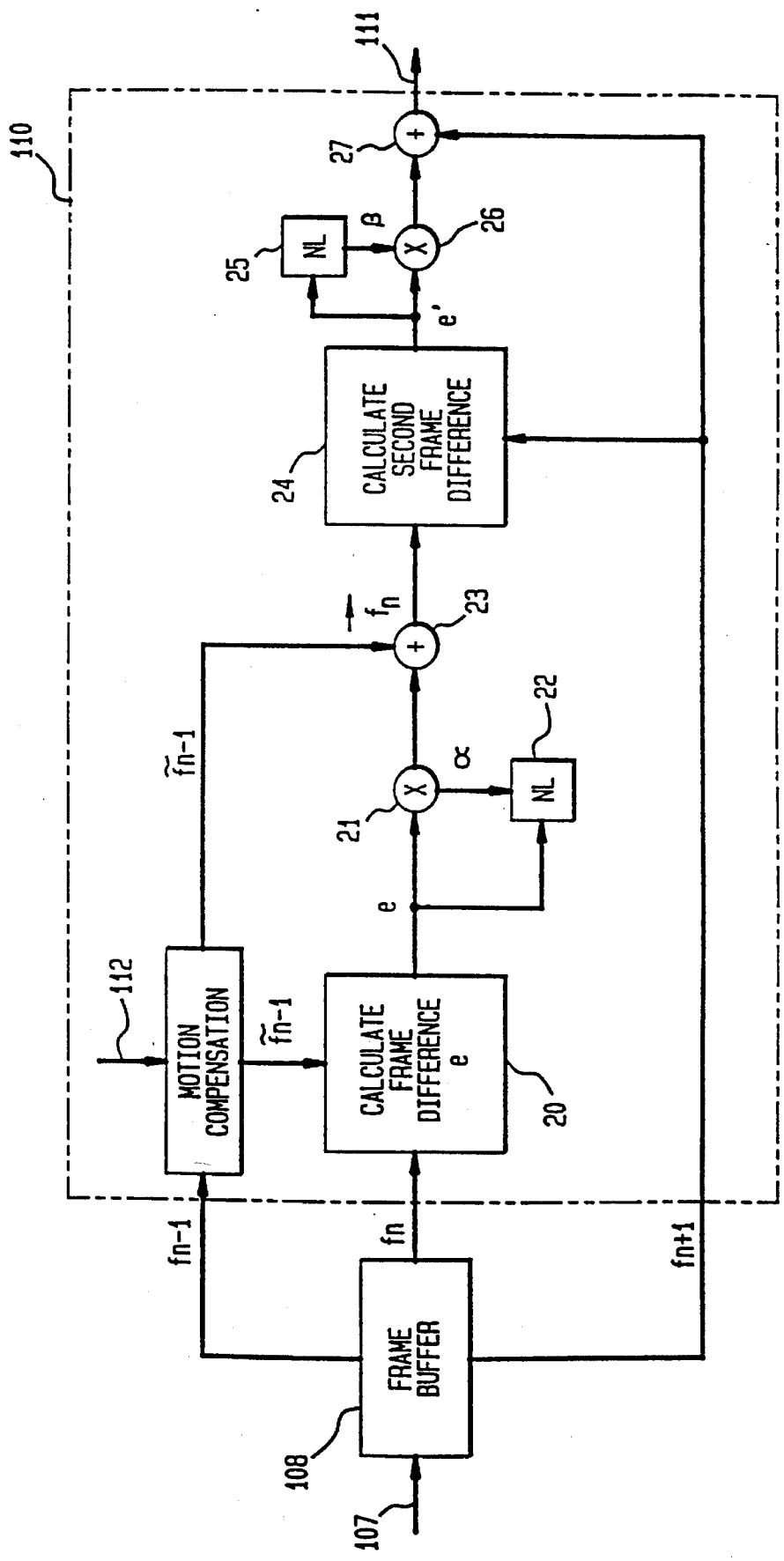
FIG. 8 is a block diagram of the temporal filtering and storage system and method of the preferred embodiment of the invention.

FIG. 8 shows the diagram of the temporal filter block 110 and frame buffer 108. As temporal filtering involves more than one frame, frame buffer 108 is used to store spatially filtered video frames 107. In the preferred embodiment, frame buffer 108 can store at least 3 frames: the current frame $f_n$, the previous frame $f_{n-1}$, and the future frame $f_{n+1}$. Buffer 108 yields these stored frames as signal 109 to temporal filter 110.

The pixel at spatial location (i,j) in frame n is defined as $p_n(i,j)$. Similarly, the pixel in frame n+1 is defined as $p_{n+1}(i,j)$, and $\tilde{p}_{n-1}(i,j)$ is the pixel in the previous best matching frame $\tilde{f}_{n-1}$. The previous best matching frame consists of macroblocks from either the previous frame n−1 or the motion-compensated frame. $\tilde{p}_{n-1}(i,j)$ is then defined as $$\tilde{p}_{n-1}(i,j) = \begin{cases} p_{n-1}(i,j) & \text{if } no\_mc\_SE < mc\_SE, \\ \bar{p}_{n-1}(i,j) & \text{otherwise.} \end{cases} \tag{25}$$

where $\bar{p}_{n-1}(i,j)$ is the pixel from the motion-compensated, macroblock of a 16×16 group of pixels, and $p_{n-1}(i,j)$ is the pixel from the previous frame n−1. No_mc_SE and mc_SE are error powers between the motion-compensated block, and the previous block, respectively. These terms are defined as follows:

$$mc\_SE = \sum_{i=1}^{16} \sum_{j=1}^{16} [p_n(i,j) - \bar{p}_{n-1}(i,j)]^2, \tag{26}$$

$$no\_mc\_SE = \sum_{i=1}^{16} \sum_{j=1}^{16} [p_n(i,j) - p_{n-1}(i,j)]^2. \tag{27}$$

With continuing reference to FIG. 8, frame difference e between the current frame $f_n$ and the previous best matching frame $\tilde{f}_{n-1}$ is calculated at first temporal subprocessor 20. Then, the frame difference e at the location (i, j) is computed as $$e(i,j) = p_n(i,j) - \tilde{p}_{n-1}(i,j) \tag{28}$$

The frame difference e(i,j) between the current frame $f_n$ and the previous best matching frame $\tilde{f}_{n-1}$ is sent to nonlinear mapper 22 where the coefficient α, a weighting factor, is determined based on the frame difference e(i,j).

The weighting factors α(i,j) for each pixel in an i-by-j matrix of pixels are multiplied by the frame difference e for each pixel by a second temporal subprocessor 21 and then added by a third temporal subprocessor 23 to the corresponding pixel of the previous best matching frame $f_{n-1}$ to obtain an intermediate weighted average current pixel $\vec{p}_n(i,j)$ of an intermediate weighted average current frame $\vec{f}_n(i,j)$.

A second frame difference e' between the weighted average pixel $\vec{p}_n(i,j)$ and the pixel $p_{n+1}$ from the future frame $f_{n+1}$ is computed by a fourth temporal subprocessor 24 as $$e'(i,j) = \vec{p}_n(i,j) - p_{n+1}(i,j) \qquad (29)$$

The second frame difference e' is then used by nonlinear filter 25 to obtain a second weighting factor β in the same manner as α was obtained.

The weighting factors β(i,j) for each pixel in an i-by-j matrix of pixels are multiplied by the frame difference e' for each pixel by a fifth temporal subprocessor 26.

A filtered pixel $\hat{p}_n(i,j)$ is calculated at sixth temporal subprocessor 27 as a weighted average of the intermediate pixel $\vec{p}_n(i,j)$ and the future adjacent pixel $P_{n+1}$.

The function(s) of each of the aforementioned temporal subprocessors 20, 21, 23, 24, 26, and 27 as well as the non-linear mappers 22 and 25 are preferably implemented by the processor which performs the functions of postfilter 100 or, in the alternative, may implemented by separate standard processors such as an 80386.

Figure 9:
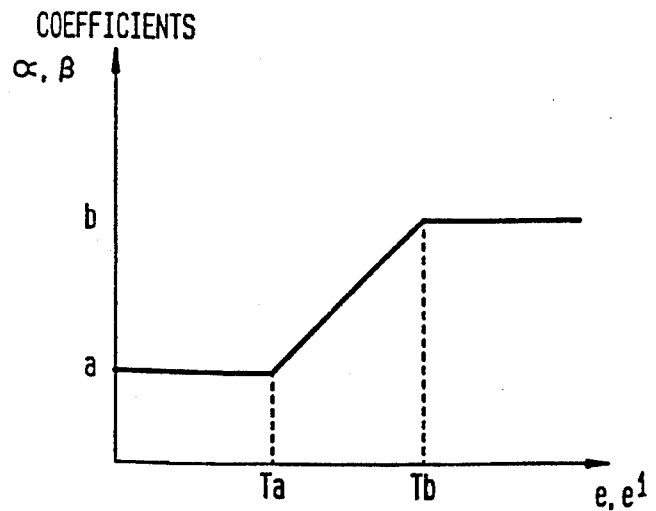
FIG. 9 is a chart illustrating the weighting factor coefficients of the temporal filter, $\alpha$ and $\beta$, of the preferred embodiment of the present invention.

The coefficients of the temporal filter, α and β, follow the nonlinear relationship shown in FIG. 9. $T_a$ and $T_b$ are predetermined thresholds determined from experimental data. In the preferred embodiment where H.261 guidelines are used, the pixel value is in the range of 0 to 255. Accordingly, in the preferred embodiment, α is selected from the range 0.1 to 1, β is selected from the range 0.1 to 1, $T_a$ is equal to a threshold of 9, and $T_b$ is equal to a threshold of 40. If e or e' is less than $T_a$, meaning that there is not much movement in the current pixel, or the motion of the current pixel is well tracked, then simple pixel averaging is applied. If e or e' is larger than $T_b$, indicating that there is a scene change or there is fast movement which can not be tracked by the motion vectors, no operation is applied. If e is between $T_a$ and $T_b$, the current pixel is in a transition area and weighted averaging is applied. By using this operation, the moving portion of an image can be well-preserved and noise can be effectively reduced.

The pixel in the filtered frame can be obtained by using the following equations:

$$\vec{p}_n(i,j) = \alpha p_n(i,j) + (1-\alpha)\tilde{p}_{n-1}(i,j), \qquad (30)$$

$$\hat{p}_n(i,j) = \beta \vec{p}_n(i,j) + (1-\beta)p_{n+1}(i,j) \qquad (31)$$

$$= \beta(1-\alpha)\tilde{p}_{n-1}(i,j) + \beta\alpha p_n(i,j) + (1-\beta)p_{n+1}(i,j) \qquad (32)$$

where $\hat{p}_n(i,j)$ is the pixel in the filtered frame. Filtered signal 111 contains a sequence of filtered pixels $\hat{p}_n(i,j)$. This filtered signal 111 is then sent to the display device 113.

Therefore, in summary, the features of the present invention include the use of a separable 3D filtering structure: space-variant FIR-Median hybrid filtering is used in the spatial domain, followed by motion-compensated nonlinear filtering in the temporal domain. As such, the present invention provides spatial and temporal operations which are adaptive to the local statistics of the signal, both spatially and temporally. In particular, spatial operations switch between linear and nonlinear filtering depending on the edge/nonedge orientation of a signal and temporal operations account for motion compensated signals. Moreover, the aforementioned filtering structure optimizes the filtering process by using cost-efficient and simplified one-dimensional spatial filtering techniques.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A filtering system for reducing artifacts in motion video sequences generated by block-based motion-compensated transform coding from a video decoder, comprising:

a postprocessor connected to said video decoder, said postprocessor including: an edge orientation detector; a spatial filter bank, said spatial filter bank being configured to receive information from said edge orientation detector, said filter bank comprising a one-dimensional filter utilizing said information to generate spatially filtered video sequences; and a motion-compensated temporal filter, said motion-compensated temporal filter receiving spatially filtered video sequences generated by said spatial filter bank, said motion-compensated temporal filter being configured to generate temporally filtered video sequences from said spatially filtered video sequences; and a frame memory in communication with said spatial filter bank, said frame memory being arranged to receive spatially filtered video sequences from said spatial filter bank.

2. The filtering system of claim 1 wherein said edge orientation detector utilizes a set of template gradient impulse response arrays to compute edge orientation.

3. The filtering system of claim 2 wherein said edge orientation detector:

convolves an image with said gradient impulse response array;

determines a maximum gradient; and compares said maximum gradient to a threshold to determine whether a pixel belongs to an edge class or a nonedge class.

4. The filtering system of claim 1 wherein said spatial filter bank comprises at least two finite impulse response linear phase filters and a median filter.

5. The filtering system of claim 4 wherein said spatial filter bank comprises:

an index to indicate a direction of operation for said finite impulse response linear phase filters, and a central input pixel from which said finite impulse response filters are measured.

6. The filtering system of claim 1 wherein said spatial filter bank comprises a finite impulse response median filter bank having varying root structures for filtering pixels in said motion video sequence.

7. The filtering system of claim 1 wherein said spatial filter bank further comprises a two dimensional low-pass filter for filtering nonedge pixels in said motion video sequence.

8. The filtering system of claim 1 wherein said frame memory is configured to store signals for a current frame, an adjacent prior frame and an adjacent future frame.

9. The filtering system of claim 8 wherein said motion-compensated temporal filter is configured to:
   determine a best matching frame from said adjacent prior frame and a motion-compensated frame; and
   calculate a frame difference between a current frame and said best matching frame.

10. The filter system of claim 9 wherein said motion-compensated temporal filter is configured to determine said best matching frame from best matching frame pixels selected from either said adjacent prior frame or said motion-compensated frame, said best matching frame pixels comprising:
   pixels from said adjacent prior frame when the absolute difference between pixels in said current frame and pixels in said motion-compensated frame is greater than the absolute difference between pixels in said current frame and said adjacent prior frame; and
   pixels from said motion-compensated frame when the absolute difference between pixels in said current frame and pixels from said adjacent prior frame is greater than the absolute difference between pixels in said current frame and pixels in said motion-compensated frame.

11. The filter system of claim 9 wherein said motion-compensated temporal filter further comprises a nonlinear mapper to determine a weighting factor based, at least in part, on the first frame difference.

12. The filtering system of claim 11 wherein said motion-compensated temporal filter is configured to calculate a weighted average current frame from said current frame and said best matching frame based, at least in part, on the weighting factor.

13. The filtering system of claim 12 wherein said motion-compensated temporal filter is configured to:
   calculate a second frame difference between said weighted average current frame with a future frame to generate a second frame difference;
   determine a second weighting factor based, at least in part, on the second frame difference; and
   calculate a second weighted average of the weighted average current frame and the adjacent future frame based, at least in part, on the second weighting factor.

14. A system for filtering decoded noise-contaminated signals for video communication, comprising:
   a computer processor;
   means for filtering spatial artifacts from decoded noise-contaminated signals, said means for filtering spatial artifacts comprising an edge detector and a one-dimensional filter;
   means for storing signals from said decoded noise-contaminated signals for at least a current frame, a prior frame and a future frame;
   means for calculating a best matching frame from said prior frame and a motion-compensated frame;
   means for calculating an intermediate weighted average frame from said current frame and a best matching frame such that the motion-compensated frame is given less weight as the difference between said intermediate weighted average frame and said motion-compensated frame increases; and
   means for calculating a filtered frame from a weighted average of the intermediate weighted average current frame and said future frame, such that said future frame is given less weight as the difference between said intermediate weighted average current frame and said future frame increases.

15. The system of claim 14 wherein said means for filtering spatial artifacts utilizes a set of template gradient impulse response arrays to compute edge orientation.

16. The system of claim 15 wherein said means for filtering further comprises means for convolving an image with said gradient impulse response array, means for determining a maximum gradient, and means for comparing said maximum gradient to a threshold to determine whether a pixel belongs to an edge class or a nonedge class.

17. The system of claim 16 wherein said means for filtering spatial artifacts comprises at least two finite impulse response linear phase filters and a median filter.

18. The system of claim 17 wherein said means for filtering spatial artifacts further comprises a two-dimensional filter, wherein said two-dimensional filter filters spatial artifacts from pixels belonging to said nonedge class, and wherein said one-dimensional filter filters spatial artifacts from pixels belonging to said edge class.

19. A three dimensional filter system for enhancing decompressed motion video sequences generated by block-based motion-compensated transform coding, comprising:
   a one-dimensional space-variant FIR-median hybrid filter, said one-dimensional space-variant FIR-median hybrid filter being structured to reduce the effect of spatial artifacts generated by block-based motion-compensated transform coding on said motion video sequences;
   a memory to store least a portion of said motion video sequences, said memory being connected to said one-dimensional space-variant FIR-median hybrid filter; and
   a motion-compensated nonlinear filter, said motion-compensated nonlinear filter being structured to reduce the effect of temporal artifacts generated by block-based motion-compensated transform coding on said motion video sequences;
   wherein said one-dimensional space-variant FIR-median hybrid filter, said memory and said motion-compensated nonlinear filter are arranged in series.

20. The filter system of claim 19 further comprising:
   a one-dimensional edge detector, said edge detector being configured to input information to said space-variant FIR-median hybrid filter to reduce the effect of spatial artifacts.

21. A method of processing and displaying decoded video image sequence signals generated by block-based motion-compensated transform coding, comprising the steps of:
   detecting the edge orientation of a pixel of said video image sequences;
   filtering spatial artifacts from said video image sequences using a one-dimensional filter for pixels determined to have an orientation in an edge region of said video sequence signals;
   storing at least a current frame, an adjacent prior frame and an adjacent future frame from said video image sequence signals;
   calculating a temporally filtered frame from a weighted average of said adjacent future frame, said current frame and a motion-compensated adjacent prior frame; and
   displaying said temporally filtered frame.

22. The method of claim 21 wherein said step of calculating a temporally filtered frame further comprises the steps of:

calculating a best matching frame;

calculating a frame difference between said current frame and said best matching frame;

determining a weighting factor based, at least in part, on said frame difference;

calculating a weighted average current frame from the current frame and said best matching frame, based, at least in part, on the weighting factor.

23. The method of claim 22 wherein said step of calculating a temporally filtered frame further comprises the steps of:

calculating a second frame difference between said weighted average current frame and said adjacent future frame, determining a second weighting factor based, at least in part, on the second frame difference, and calculating a weighted average of the weighted average current frame and said adjacent future frame based, at least in part, on said second weighting factor.

24. The method of claim 21 wherein said step of detecting the edge orientation of a pixel comprises the steps of:

convolving said pixel with a gradient impulse response array;

determining a maximum gradient; and comparing said maximum gradient to a threshold to determine whether a pixel belongs in an edge region or a nonedge region.

25. The method of claim 21 wherein said step of filtering spatial artifacts from said video image sequences comprises the step of:

filtering spatial artifacts from said video image sequences using a two-dimensional low-pass filter for pixels determined to have an orientation in a nonedge region of said video sequences.

26. The method of claim 25 wherein said step of filtering spatial artifacts from said video image sequences comprises the steps of:

calculating the output of said two-dimensional low-pass filter as a function of a center pixel $p(x,y)$ and all pixels from $p(x-L, y-L)$ to $p(x+L, y+L)$ where L is equal to (window length-1)/2.

27. The method of claim 21 wherein said step of filtering spatial artifacts further comprises the steps of:

selecting a direction from a pixel at the edge region $p(c+L)$ through a center pixel $p(c)$ to a second pixel at the edge region $p(c-L)$;

calculating the output of a first finite impulse response filter as a function of a center pixel $p(c)$ and all pixels from $p(c)$ to $p(c+L)$ along said direction;

calculating the output of a second finite impulse response filter as a function of center pixel $p(c)$; and calculating the output of a third finite impulse response filter as a function of all pixels from $p(c-1)$ to $p(c-L)$ along said direction;

wherein L is equal to (window length−1)/2.

28. The method of claim 27 wherein said step of filtering spatial artifacts further comprises the step of:

calculating the median of outputs of said finite impulse response filters.

29. The method of claim 28 wherein said step of filtering spatial artifacts further comprises the steps of:

selecting a direction of operation for said finite impulse response filters; and calculating the overall output taken over the median of outputs of said finite impulse response filters in said direction of operation from a central input pixel from which said finite impulse response filters are measured.

* * * * *